United States Patent [19]

Sherwood

[11] 4,078,807

[45] Mar. 14, 1978

[54] PHONOGRAPH RECORD PLAYER

[76] Inventor: Henry A. Sherwood, 30 North Rd., Short Hills, N.J. 07078

[21] Appl. No.: 667,810

[22] Filed: Mar. 16, 1976

Related U.S. Application Data

[63] Continuation of Ser. No. 520,395, Nov. 4, 1974, abandoned.

[51] Int. Cl.$^2$ ............................................. G11B 25/04
[52] U.S. Cl. .................................. 274/9 R; 274/39 A
[58] Field of Search ..................... 274/1 A, 9 R, 39 R, 274/39 A

[56] References Cited

U.S. PATENT DOCUMENTS

| | | | |
|---|---|---|---|
| 3,422,566 | 1/1969 | Wolf | 274/9 R |
| 3,467,393 | 9/1969 | Kuwayama | 274/9 R |
| 3,721,449 | 3/1973 | Sirinek | 274/1 A |
| 3,823,946 | 7/1974 | Nakajima | 274/9 R |

Primary Examiner—Harry N. Haroian
Attorney, Agent, or Firm—Arthur A. March

[57] ABSTRACT

A phonograph record player including a speaker, a turntable and resettable tone arm. The speaker is fixedly secured to the casing of the record player and the tone arm is in contact with the speaker and the record as the record is being played. The turntable is mounted on a spindle carried by a transversely extending cantilever arm which is either attached to the base of the casing of the record player or is an integral part of the said casing. The cantilever arm arrangement enables the turntable to move resiliently in all directions being only restricted by the needle point thus providing a relatively stiff coupling arrangement between the record, the turntable and the speaker. The tone arm, which is radially spring biased, is maintained against the action of the spring in the grooves of the record throughout play of the record and by the central portion of the record when play is completed. The record is normally urged into contact with the tone arm by the pressure of the cantilever arm. The aforesaid cantilever arrangement also enables the turntable to be depressed to permit the record to become disengaged from the tone arm so that the tone arm will return to its starting position.

17 Claims, 6 Drawing Figures

FIG.1
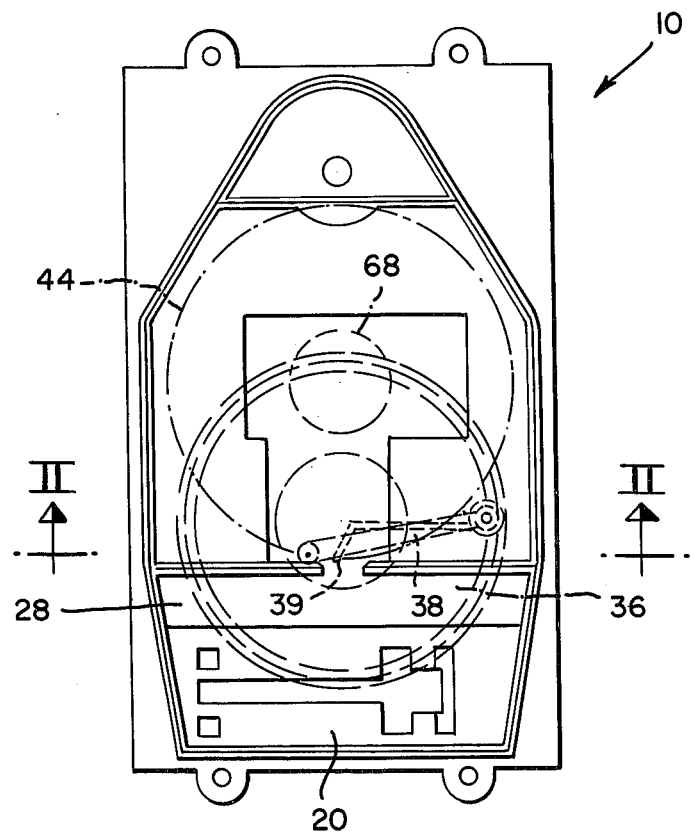
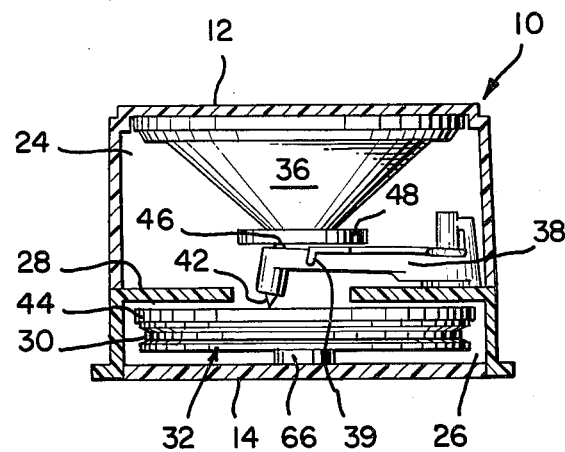
FIG.2

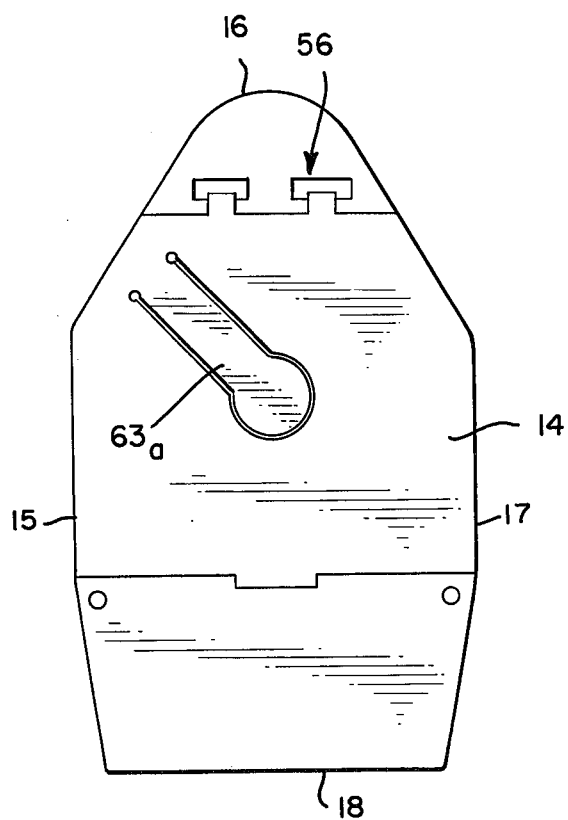
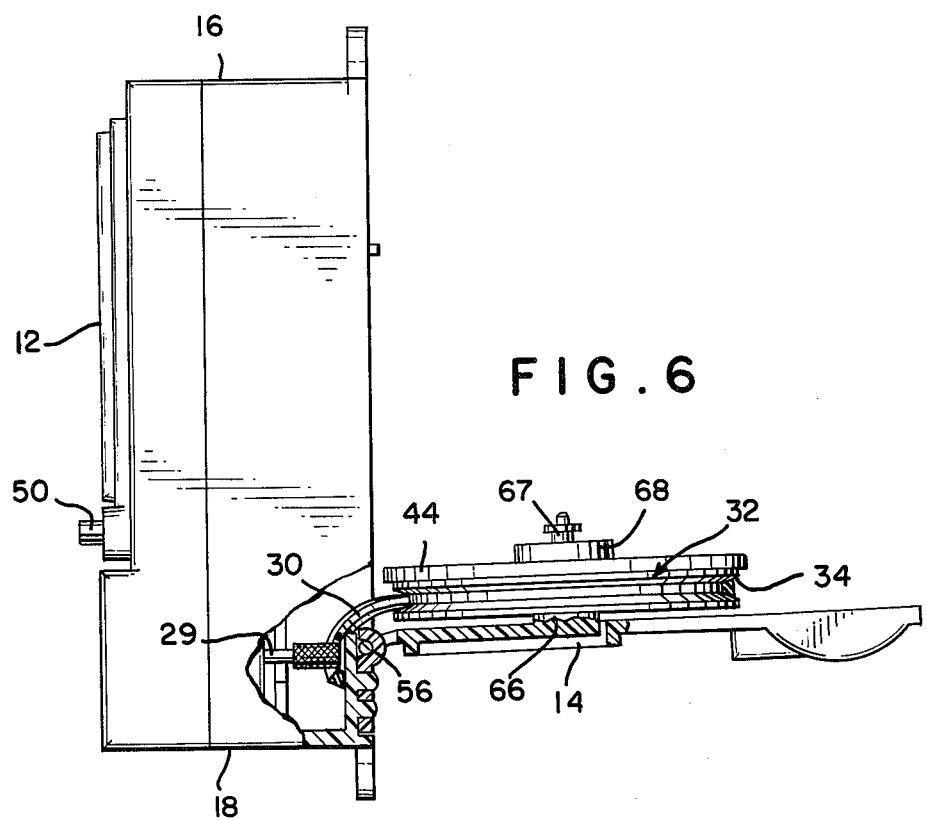

PHONOGRAPH RECORD PLAYER

This is a continuation of copending application Ser. No. 520,395 filed Nov. 4, 1974, and now abandoned.

BACKGROUND OF THE INVENTION

In phonograph record players, the turntable as well as the records themselves are often uneven on their surfaces and irregular, thus causing what is called a "wobble" and it therefore becomes necessary to compensate for this irregularity and unevenness while nevertheless obtaining a true reproduction of the tone of a record and to maintain its quality. Many specific structures involving the basic elements of the record player, viz, the record, the turntable and the speaker have been heretofore proposed to accomplish this compensation. Some of the proposals involved arrangements in which the speaker itself "floats", i.e. the speaker is resiliently mounted to yield under pressure to accomplish the aforesaid compensatory effect. However, such arrangements provide a very loose coupling arrangement between the speaker and the turntable and thereby adversely affects the reproduction of the record.

Other attempts to achieve the compensatory effect involved structure in which the turntables themselves are spring mounted to achieve the desired resiliency. However, these turntables are disposed either on a tiltable axle or arranged to move transversely of the axle. The degree of slope of the tilt for resetting the tone arm in the tiltable turntables in order that the tone arm may be reset especially close to the center is most difficult to achieve in smaller units due to the necessity for a large angle. The spring mounted turntables which move transversely of their axles require long bearing surfaces and are slow to follow up and down movement because of the off-center pressure of the tone arm on the records. Thus the various attempts to achieve the "floating" arrangement to compensate for uneven conditions in the reproduction system including the turntable and records have provided loose couplings which adversely affect the nature of the tone and accuracy and reproduction of the record itself.

SUMMARY OF THE INVENTION

The present invention provides a structure in which all the aforesaid problems are overcome, while nevertheless maintaining a relatively stiff connection between the basic elements of the talking unit, thus assuring maximum tone and clarity of reproduction. The invention provides means for accomplishing the necessary compensatory effect for the aforesaid uneven conditions without the utilization of any "floating" speaker or of the heretofore provided spring mounted on tiltable turntables. In the present invention, the speaker is fixedly mounted on the casing of the record player and at all times during play of the record is in engagement with the tone arm. The turntable itself has a relatively stiff and tight coupling to the tone arm by being flexible in all directions, but supported off its center by the point of the needle only. Thus, in the present invention the speaker is affixed to the housing and the tone arm is carried in the usual manner. However, the turntable itself is mounted on a unique and novel resilient cantilever arrangement utilizing a movable arm which extends beneath and, in effect, carries the turntable. One end of the arm is either affixed to or made a part of the phonograph casing itself while the other end is secured to or is itself a part of the spindle extending through the center of the turntable itself. As a consequence of the structure of the present invention, sufficient resiliency in all directions is imparted to the turntable to provide for the compensating movement required while, on the other hand, no loose coupling in the form of a separate spring mounted turntable or a "floating" speaker is necessary so that a relatively stiff coupling is accomplished by the present invention with all the desirable and advantageous benefits obtained therefrom.

The present invention is hereinafter described with reference to certain illustrations and a description thereof, it being understood, however, that the description and drawings are merely illustrative of the invention and are in no way intended to limit the scope thereof.

BRIEF DESCRIPTION OF THE DRAWINGS

In the drawings:

FIG. 1 is a top plan view of the phonograph record player of the present invention without the cover plate, FIG. 2 is a sectional view taken along the lines 2-2 of FIG. 1, FIG. 5 is a plan view of the underside of record player showing the cantilever arm shown in FIG. 3, and FIG. 6 is a side view partly in section showing the turntable moved out of the housing for loading and unloading records.

DETAILED DESCRIPTION OF THE INVENTION

Figure 3:
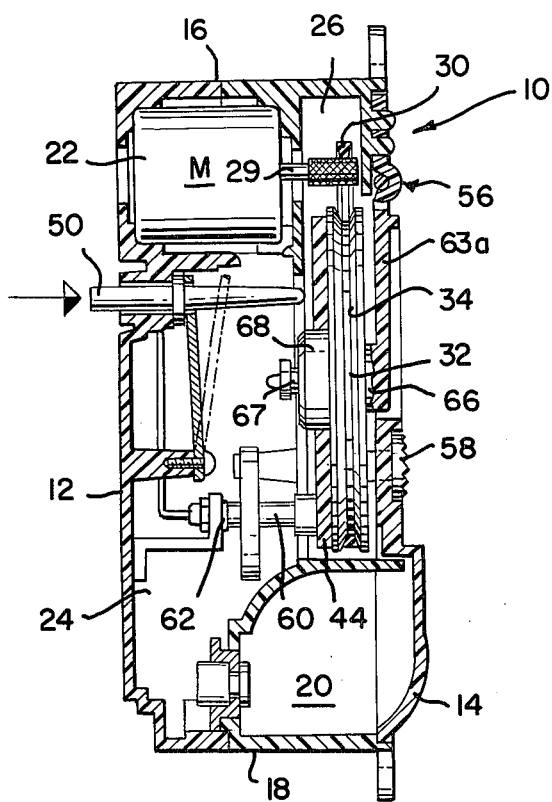
FIG. 3 is a side sectional view showing the details of the turntable and the cantilever arm of the present invention.

As shown in the drawings, a phonograph record player housing 10 is provided which includes top and bottom walls 12 and 14 and side walls 15 through 18 respectively. The housing includes a compartment or section 20 to accommodate batteries which, in turn, activate the motor 22 through conventional and well-known circuitry (not shown). The housing 10 is, in effect, divided into an upper compartment 24 and a lower compartment 26 divided by an apertured plate 28 which extends laterally across the housing from the battery compartment 20 to the other side.

As illustrated in FIG. 3, the upper compartment 24 contains the motor 22 which carries a shaft 29 around which a belt 30 is disposed. The lower portion of the housing 26 contains a turntable 32 which is provided with a groove 34 around its perimeter to accommodate the belt 30. While this form of driving connection between the motor and the turntable has been illustrated, it will be understood that any of the conventional forms of drive may be utilized, including well known friction drive arrangements as well as others.

As shown in FIG. 2, the upper portion 24 of the casing carries a speaker 36. A pivotally movable tone arm 38 is arranged in the upper portion 24 of the casing. The tone arm 38 rides in an opening in plate 28 so that the needle carrying portion of the tone arm is free to engage in the grooves of the record 44 while the other end of the tone arm has a nib 46 to engage the plate 48 on the speaker 36 so as to impart sound through said speaker. The tone arm is provided with a biasing spring 39 normally urging the tone arm into position at the outer perimeter of the turntable 32 whereby it engages in the outer grooves of the record 44 in conventional fashion as play of the record is started in the manner hereinafter described. The upper portion 24 of the casing also carries a reset pin 50 which is biased to normally assume the position shown in FIG. 3 in which the upper end of the pin extends outwardly from the casing. The lower end of the pin is adapted to depress the record for the purposes hereinafter set forth.

The lower plate 14 of the casing is hingedly connected at 56 to the remainder of the casing and a latch 58 maintains the lower plate in closed position. The plate 14 carries a post 60, preferably formed integrally therewith, which engages a contact 62 to establish the electrical connection between the motor 22 and the batteries disposed in section 20 when the lower plate is closed. It will be understood however that while this form is illustrated, any form of suitable electrical connection may be used in connection with the present invention.

Figure 4:
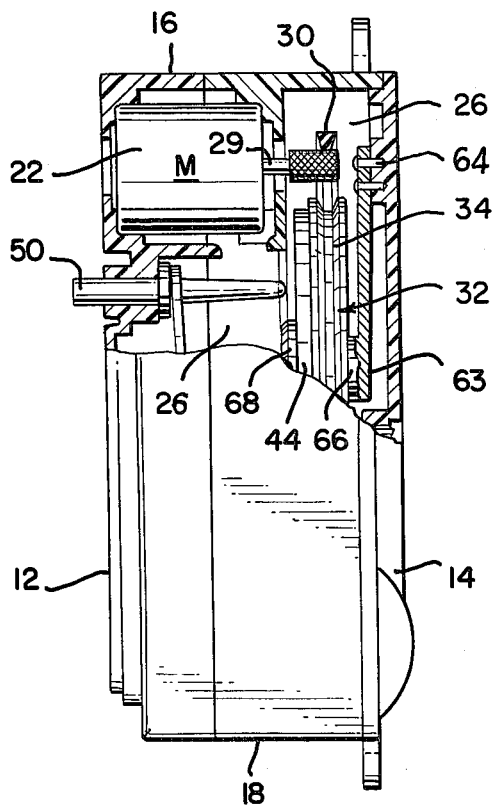
FIG. 4 is a sectional view showing a modified form of the cantilever arm structure of the present invention.

The structure of the present invention provides for the compensatory action for the irregularities and uneven condition by means of a new and novel cantilever arm 63. One end 64 of the arm is affixed to the lower plate 14 while the other end carries a spindle 66 extending through the central portion of the turntable. The spindle 66 forms a journal carrying the turntable shaft 67 which carries an enlarged casing 68 adapted to frictionally engage the record 44 at its central apertured portion. The cantilever arrangement may be provided by a spring 63, as FIG. 4. It may, on the other hand, be an integral cut-out portion 63a of the lower casing 14 itself. Whether the cantilever arrangement is a separate unit or part of the casing does not affect the operational and structural advantages obtained by this structure of the present invention. The cantilever arm normally urges the turntable and record into contact with the tone arm and, in turn, the tone arm with the speaker. In addition, however, the cantilever arm also provides for the desirable all directional resiliency for the turntable carried thereby so that any uneveness or irregularities express itself before and after the needle point while at the needle point there is the highly advantageous constant contact with the record and providing the engagement between the record and the speaker. There are, as will be noted, no separate springs nor tilting axles. Furthermore, the speaker itself is fixedly mounted which is a highly desirable structural accomplishment providing a rigid system with the consequent maximum volume and clarity of reproduction.

In operation, the tone arm 38 is disposed at the outer edge of the turntable and the record under the action of spring 39. When electrical contact is established between the batteries in section 20 and the motor 22, i.e. by closing the casing so that the contact is established, the shaft 29 will rotate causing the belt 30 to drive the turntable 32 and rotate the record 44 carried thereby. The spring 39 is of such construction and balance that while it will bias the tone arm 38 to the outer edge of the turntable and record, when the needle 42 carried by the tone arm is engaged in the grooves of the record 44 there is insufficient force exerted to move the tone arm out of the grooves. Thus, when the needle 42 of the tone arm 38 engages in the grooves of the record 44, the needle begins to move inwardly of the record so that the record is played with the sound being emitted from the fixed speaker 36.

The new and novel arrangement economically and efficiently provides not only that compensatory action necessary to accommodate irregularities and uneven conditions but also makes for an efficient phonograph unit in which the basic components of speaker, turntable and record are relatively rigidly coupled together. This provides for a true, cler, load and accurate reproduction and for a unit which is possessed of great longevity. The unit and its various components may of course be of any desired size and shape as well as being constructable out of any suitable material.

The foregoing specification and drawings are solely for the purpose of facilitating an understanding of the present invention whose scope is expressed in the appended claims.

I claim:

1. A phonograph record player comprising a housing, speaker and turntable, a tone arm disposed between said speaker and turntable for engagement therebetween, driving means for said turntable and a cantilever arm stationarily fixedly positioned on said housing and resiliently operatively independently and directly supporting said turntable in any direction of movement thereof with respect to said housing for operative engagement thereof with said tone arm, said cantilever arm providing the sole support for said turntable.

2. The phonograph record player of claim 1 in which said cantilever arm is formed of resilient material and disposed to urge said turntable resiliently into engagement with said tone arm.

3. The phonograph record player of claim 2 in which the cantilever arm is a leaf spring arrangement having one free end and one end secured to the housing.

4. The phonograph record player of claim 2 in which the speaker is affixed to the housing.

5. The phonograph record player of claim 2 in which the cantilever arm is an integral part of the housing.

6. The phonograph record player of claim 5 in which the housing comprises a hinged base plate.

7. The phonograph record player of claim 6 including latch means for maintaining said base plate in closed position.

8. The phonograph record player of claim 2 in which the housing includes a pivotably movable base plate carrying said turntable.

9. The phonograph record player of claim 2 in which the turntable has a central aperture and one end of the cantilever arm carries a spindle extending through said aperture in said turntable.

10. The phonograph record player of claim 2 including baising means for said tone arm normally urging said tone arm to the outer perimeter of said turntable.

11. The phonograph record player of claim 11 including a resetting means for returning the tone arm from a position near the center of said turntable to a position at the outer perimeter of said turntable.

12. The phonograph record player of claim 12 in which said resetting means is adapted to engage the turntable to move against the action of the cantilever arm to thereby release the tone arm for return to the outer perimeter of said turntable.

13. The phonograph record player of claim 12 including resilient biasing means for said resetting means.

14. A phonograph record player comprising a housing, speaker and turntable, a tone arm disposed between said speaker and turntable for engagement therebetween, driving means for said turntable and a cantilever arm having a turntable spindle in engagement with said turntable and providing the sole support for the turntable spindle, in which said housing comprises a hinged base plate, and said cantilever arm formed in the base plate as an integral part of the base plate material and is defined by a partially cut-out portion of said base plate and is formed of resilient material and disposed to urge said turntable resiliently into engagement with said tone arm.

15. A phonograph record player comprising a housing, a speaker and a turntable having a central aperture, a tone arm disposed between said speaker and said turntable for engagement therebetween, driving means for said turntable, said housing having a hinged base plate, a cantilever arm formed in the base plate as an integral part of the base plate material and defined by a partially cut-out portion of said base plate having a fixed end integral with the base plate and a free end terminating in a spindle and providing the sole support for the turntable spindle, a shaft for said turntable journaled in said spindle and extending through the aperture in said turntable and biasing means for said tone arm for normally urging said tone arm to the outer perimeter of said turntable.

16. The phonograph record player of claim 15 including resetting means for returning the tone arm from a position near the center of the turntable to a position at the outer perimeter of said turntable.

17. A phonograph record player comprising a housing, speaker and turntable, a tone arm disposed between said speaker and turntable for engagement therebetween, driving means for said turntable and a cantilever arm in engagement with said turntable, said cantilever arm being stationarily fixedly positioned on said housing and independently and directly carrying said turntable in resting relation thereon and providing the sole support for said turntable, said cantilever arm carrying a spindle and said turntable being operatively journaled on said spindle to said cantilever arm for rotation thereon, and said cantilever arm being formed of resilient material and disposed to urge said turntable resiliently into engagement with said tone arm.

* * * * *